(12) United States Patent
Hsu

(10) Patent No.: US 6,996,716 B1
(45) Date of Patent: Feb. 7, 2006

(54) DUAL-TIER SECURITY ARCHITECTURE FOR INTER-DOMAIN ENVIRONMENTS

(75) Inventor: Yung-Kao Hsu, Marlboro, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/460,897

(22) Filed: Dec. 14, 1999

Related U.S. Application Data

(60) Provisional application No. 60/129,496, filed on Apr. 15, 1999.

(51) Int. Cl.
*H04L 9/00* (2006.01)

(52) U.S. Cl. .................. 713/175; 709/238; 370/352
(58) Field of Classification Search ............... 713/175, 713/193; 379/1; 370/352, 270, 401; 709/238, 709/225, 244, 313
See application file for complete search history.

(56) References Cited

U.S. PATENT DOCUMENTS

| | | | |
|---|---|---|---|
| 5,696,880 A * | 12/1997 | Gustafson et al. | 704/273 |
| 5,982,898 A | 11/1999 | Hsu et al. | |
| 6,229,804 B1 * | 5/2001 | Mortsolf et al. | 370/352 |
| 6,269,149 B1 * | 7/2001 | Hassell et al. | 379/1.01 |
| 6,327,660 B1 * | 12/2001 | Patel | 713/193 |
| 6,374,302 B1 * | 4/2002 | Galasso et al. | 709/238 |

OTHER PUBLICATIONS

A Gatekeeper discovery mechanism for H.323 systems, by Senthil Sengodan, Nokia Research Center, Nov. 1998, SPIE vol. 3528.*

* cited by examiner

*Primary Examiner*—Kim Vu
*Assistant Examiner*—Thanhnga Truong

(57) ABSTRACT

A two-tier security architecture that provides balance between the use of public and secret-key cryptography to realize cost-effectiveness and scalability of security. One tier is an intra-zone tier and the other tier is an inter-zone tier. The intra-zone tier addresses communication between users employing endpoints within a prescribed Security Zone and is designed to achieve cost-effectiveness. The inter-zone tier specifies how communication between users employing endpoints from different Security Zones can be established and is designed to provide scalability for intra-enterprise and/or inter-enterprise communications. Specifically, each Security Zone has a "Zone Keeper" and one or more endpoints that may be employed by users. The Zone Keeper authenticates, i.e., validates, users employing an endpoint in the Security Zone and determines whether a caller and a callee are security compatible. When setting up a communication, the caller provides the Zone Keeper security information in order for the caller to prove its identity. The callee supplies to the caller information confirming its identity. A proposal on how the communication is to be Set-up is sent from the caller to the callee, and if they agree to the proposal and their security is authenticated, the communication is started. For inter-zone, inter-domain, communications, the caller provides information as described above to its Zone Keeper. Then, the caller's Zone Keeper forwards the caller's request to the Zone Keeper of the security associated with the callee. Additionally, the caller's Zone Keeper also supplies the callee's Zone Keeper with its security identity so that the callee's Zone Keeper may authenticate that the request is from the caller's Zone Keeper. Then, the callee's Zone Keeper sends back an authorization to the Caller's Zone Keeper. This authorization includes the callee's Zone Keeper security identity so that the caller's Zone Keeper can authenticate that the authorization is from the callee's Zone Keeper.

46 Claims, 5 Drawing Sheets

DUAL-TIER SECURITY ARCHITECTURE FOR INTER-DOMAIN ENVIRONMENTS

RELATED APPLICATION

This application claims the priority of the corresponding provisional application Ser. No. 60/129,496, filed Apr. 15, 1999.

TECHNICAL FIELD

This invention relates to securing multimedia communication in a data network and, more particularly, in inter-domain environments.

BACKGROUND OF THE INVENTION

Most security arrangements rely heavily on the use of public-key cryptography, X.509 certificates and public-key infrastructure (PKI) to provide scalability. Critical to such security arrangements is that each end user and user device can be authenticated by an X.509 certificate. However, this assumption may not be viable for future systems because there are serious key management issues relating to PKI design and deployment. Indeed, there is no real cost effective solution for certificate revocation and key management. Secret-key cryptography, where communicating parties must share a security key in advance, e.g., ID/Password, will continue to play an important role for user authentication in an enterprise or public communication environment. Although secret-key arrangements are simple and highly portable, they are not scalable.

SUMMARY OF THE INVENTION

Problems and limitations with prior known security arrangements are overcome by employing a two-tier security architecture that provides balance between the use of public and secret-key cryptography to realize cost-effectiveness and scalability of security. One tier is an intra-zone tier and the other tier is an inter-zone tier. The intra-zone tier addresses communication between users employing endpoints within a prescribed Security Zone and is designed to achieve cost-effectiveness. The inter-zone tier specifies how communication between users employing endpoints from different Security Zones can be established and is designed to provide scalability for intra-enterprise and/or inter-enterprise communications.

Specifically, each Security Zone has a "Zone Keeper" and one or more endpoints that may be employed by users. The Zone Keeper authenticates, i.e., validates, users employing an endpoint in the Security Zone and determines whether a caller and a callee are security compatible. When setting up a communication, the caller provides the Zone Keeper security information in order for the caller to prove its identity. The callee supplies the caller information confirming its identity. A proposal on how the communication is to be Set-up is sent from the caller to the callee, and if they agree to the proposal and their security is authenticated, the communication is started.

For inter-zone, i.e., inter-domain, communications, the caller provides information as described above to its Zone Keeper. Then, the caller's Zone Keeper forwards the caller's request to the Zone Keeper of the Security Zone associated with the callee. Additionally, the caller's Zone Keeper also supplies the callee's Zone Keeper with its security identity so that the callee's Zone Keeper may authenticate that the request is from the caller's Zone Keeper. Then, the callee's Zone Keeper sends back an authorization to the Caller's Zone Keeper. This authorization includes the callee's Zone Keeper security identity so that the caller's Zone Keeper can authenticate that the authorization is from the callee's Zone Keeper. Then, as indicated above, the callee supplies to the caller information confirming its identity. A proposal on how the secure communication is to be Set-up is sent from the caller to the callee and if they agree to the proposal, and their security is authenticated, the communication is started.

In a specific example, the secure communication is directed toward a multimedia application or some other multimedia communication.

One technical advantage of the invention is that individual users/endpoints do not have to know the security mechanism for establishing an inter-zone secure communication. Another technical advantage of the invention is that users/endpoints in different security zones can communicate securely as though they were in the same security zone.

DETAILED DESCRIPTION

Figure 1:
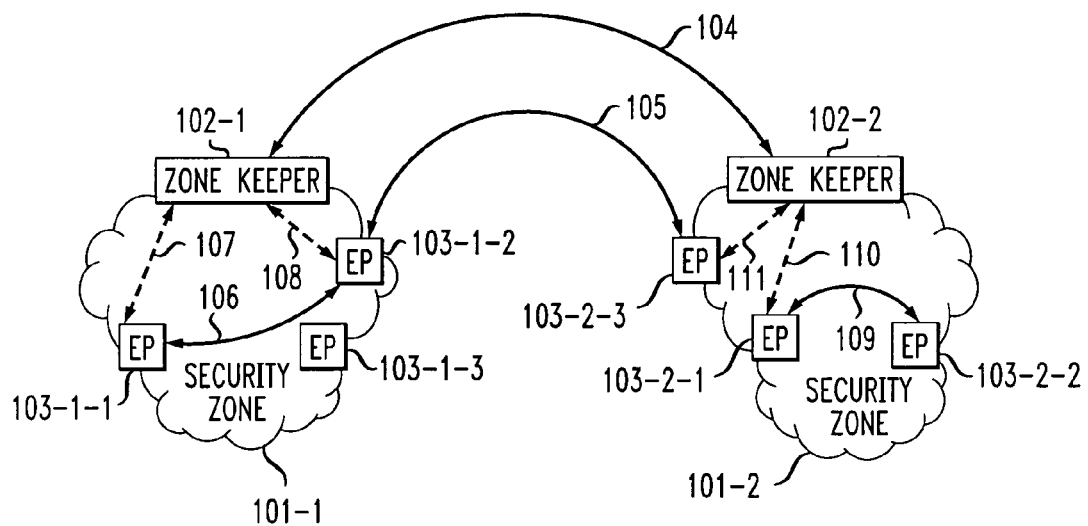
FIG. 1 shows, in simplified form, details of a two tiered security system including an embodiment of the invention.

FIG. 1 shows, in simplified form, details of a two tiered security system including an embodiment of the invention. Specifically, shown is a multiple zone, i.e., domain, system including Security Zone 101-1 and Security Zone 101-2. For simplicity and clarity of exposition only two Security Zones are shown and described here, however, it will be apparent that any desired number of Security Zones may be employed depending on their manageability. Each of Security Zones 101-1 and 101-2 is a collection of so-called endpoints that are managed as an enterprise. Endpoint devices are intended to operate on behalf of their users to communicate with each other and their so-called Zone Keeper. A Security Zone may be established in any number of environments, for example, a corporate office and/or branch office, a cable system within a prescribed geographical area, a local calling area of a telephone company or the like. Note that physical environments or communication devices do not restrict a Security Zone. For example, a group of users can form a Security Zone if they agree to have their communications be managed by the same Zone Keeper. Thus, Zone Keepers 102-1 and 102-2 are associated on a one-to-one basis with Security Zones 101-1 and 101-2, respectively. A Zone Keeper is an operation, administration, and maintenance facility provided by the enterprise associated with the Security Zone to enforce a security policy for communication in its associated Security Zone and, also, between Zone Keepers associated with other Security Zones. A Zone Keeper may be a standalone system or a subsystem in, for example, a router, PBX (private branch exchange) or the like. In this example, Security Zone 101-1 includes endpoints 103-1-1, 103-1-2 and 103-1-3, while Security Zone 101-2 includes endpoints 103-2-1, 103-2-2 and 103-2-3. Again, each Security Zone 101 may include as many endpoints 103, as desired only being limited by management issues. Each endpoint is, for example, a data communication device such as a telephone, personal computer, PDA (personal digital assistant), or the like. Communication between Zone Keeper 102-1 and Zone Keeper 102-2, in accordance with a prescribed protocol, is illustrated by communication path 104, as will be described below. Similarly, in this example, communication between endpoint 103-1-2 in Security Zone 101-1 with endpoint 103-2-3 in Security Zone 101-2 is illustrated by communication path 105, in accordance with a prescribed protocol, as will be described below. In this example, communication within Security Zone 101-1, between endpoint 103-1 and Zone Keeper 102-1 is illustrated by communication path 107, in accordance with a prescribed protocol. Communication between endpoint 103-1-1 and endpoint 103-1-2 is illustrated by communication path 106 and communication by endpoint 103-1-2 Zone Keeper 102-1 is illustrated by communication path 108. In Security Zone 101-2, communication between endpoint 103-2-1 and Zone Keeper 102-1 is illustrated by communication path 110. While communication between endpoints 103-2-1 and 103-2-2 is illustrated by communication path 109, and communication between endpoint 103-2-3 and Zone Keeper 102-2 is illustrated by communication path 111, it should be noted that the communications paths simply indicate that data is exchanged between endpoints and/or endpoints and a Zone Keeper and/or Zone Keepers, and the communications paths are not permanent connections.

Note that a Security Zone, has the following characteristics:

It must have a Zone Keeper (Gatekeeper).
  All calls originated within the Security Zone are routed through the Zone Keeper.
  The Zone Keeper assures the authenticity of every endpoint in the Security Zone.

A Security Zone should be deployed in a secured environment that is not subject to active attacks such as denial-of-service attacks. Examples of such environments are intranets with trusted firewalls, and VPNs (Virtual Private Networks).

It is also felt best to define some terms as follows:

Authentication The process of verifying that the respondents are, in fact, who they say they are.

Digital Signature Systems that allow individuals and/or organizations to electronically certify such features as their identity, their ability to pay, or the authenticity of an electronic document.

Integrity the property that exchanged data has not been altered in an unauthorized manner.

Encryption a mode of communication in which only the explicitly enabled parties can interpret the communication.

Key management the generation, storage, distribution, deletion, archiving and application of keys in accordance with a security policy.

Private-key The secret key of a public-private-key cryptography system. This private-key is used to "sign" outgoing messages, and is used to decrypt incoming messages.

Public-Key The public-key of a public-private-key cryptography system. This public-key is used to confirm "signatures" on incoming messages or to encrypt a file or message so that only the holder of the private-key can decrypt the file or message.

Public-Key

Cryptography A cryptography system that uses two different keys to "lock" and "unlock", i.e., encrypt and decrypt, respectively, messages and files. The two keys are mathematically linked together. An individual's public-key is distributed to other users and is used to encrypt messages to the individual. The individual keeps the private-key secret and uses it to decrypt messages sent with the public-key. RSA (Rivest, Shamir and Adleman algorithm) and ElGamal are just two examples of public-key cryptography systems.

Figure 2:
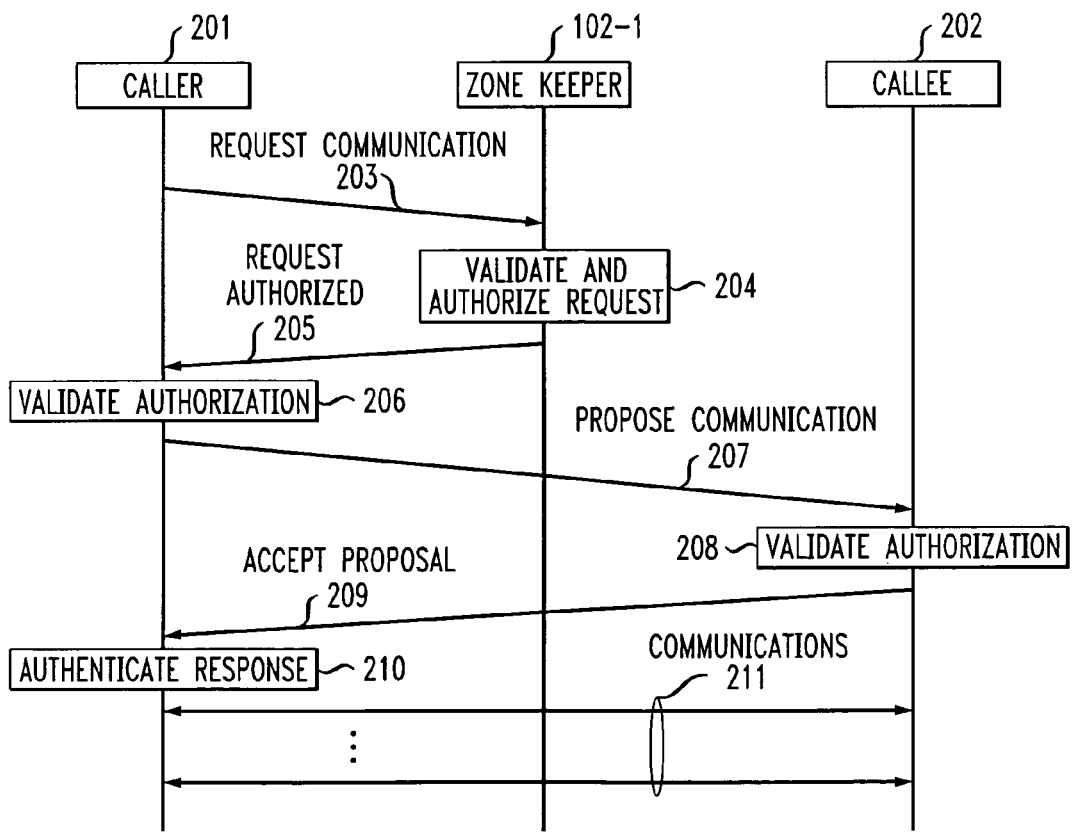
FIG. 2 is an information flow diagram illustrating the Set-up process for a secure intra-zone communication between a caller and a callee employing the invention.

FIG. 2 is an information flow diagram illustrating the Set-up process for a secure intra-zone communication between a caller 201 and a callee 202 employing the invention. Thus, shown in Security Zone 101-1 are caller 201 employing, for example, endpoint 103-1-1, callee 202 employing, for example, endpoint 103-1-2 and Zone Keeper 102-1. As indicated above, communication between endpoint 103-1-1 and Zone Keeper 102-1 is illustrated by communication path 107 and communication between endpoint 103-1-1 and endpoint 103-1-2 is illustrated by communication path 106. Then, the steps taken in setting up a secure multimedia communication between caller 201 employing endpoint 103-1-1 and callee 202 employing endpoint 103-1-2 are as follows:

Step 203 Caller 201 sends its request via endpoint 103-1-1 to its Zone Keeper 102-1. The request includes security information so that the identity of caller 201 can be verified.

Step 204 Zone Keeper 102-1 authenticates, i.e., authenticates the identity of caller 201 and, then, authorizes the request. Zone Keeper 102-1 can determine whether caller 201 and callee 202 are security compatible for their communication. For example, callee 202 may have indicated that it will not accept any communication from caller 202. Also, the endpoint employed by callee 202 may not be able to handle the level of encryption requested by the caller for their communication.

Step 205 Zone Keeper 102-1 sends its authorization of the request to caller 201. The authorization includes security information for the caller to prove it is indeed Zone Keeper 102-1. Also included in the authorization is the security information for the caller to authenticate callee 202.

Step 206 Caller 201, employing endpoint 103-1-1, authenticates, i.e., authenticates, the authorization sent by its Zone Keeper 102-1.

Step 207 Caller 201 requests connection to callee 202. The request includes the authorization from Zone Keeper 102-1 and the security information needed by callee 202 to prove its identity. Also included in the request is a proposal of how the caller—callee communication should be Set-up.

Step 208 Callee 202, employing endpoint 103-1-2, authenticates, i.e., authenticates the authorization and communication proposal.

Step 209 Callee 202 sends to caller 201 the agreement for their communication indicating that it accepts the proposal. The agreement includes information proving the identity of callee 202.

Step 210 Caller 201 authenticates the identity of callee 202.

Step 211 Based on their agreement the caller 201 and callee 202 start their communication.

In one example, the above process is employed to establish a secure multimedia application or other secure multimedia communication.

Note that in the above process, Zone Keeper 102-1 is able to authenticate users employing endpoints 103-1-1 through 103-1-3 in Security Zone 101-1 in order to secure communications. The architecture does not mandate the security technology used by Zone Keeper 102-1 to authenticate the identity of each user. It is left to the particular enterprise to select the security technology that it will use based on its own security policy. For example, an enterprise can use an identification and corresponding password (ID/Password) arrangement for performing the authentication, even if it has relative low-level security requirements for the Security Zone. Whatever the enterprise may use as its security arrangement, Zone Keeper 102-1 is able to use the chosen arrangement to authenticate the identity of the requesting user.

As an administration facility, Zone Keeper 102-1 provides the capability to register authentication keys and methods for every user employing one of endpoints 103-1 in Security Zone 101-1. To provide additional security, the registration of authentication keys and methods capability may be extended to endpoints 103-1 in Security Zone 101-1. In such an instance, Zone Keeper 102-1 may only honor requests from authenticated users initiated from authenticated endpoints.

As an enhancement, users can register with Zone Keeper 102-1 to enforce individual security policies. For example, managers may request that encryption is required for communications among managers. Note that this embodiment of the invention does not require the support of such a registration capability.

Zone Keeper 102-1 uses public-key cryptography and digital signature technology to authenticate itself to users employing endpoints 103-1 in zone 101-1. For each response it sends to a user employing an endpoint 103-1, Zone Keeper 102-1 includes a digital signature. Zone Keeper 102-1 creates this signature by "signing" the response message with its private-key. After receiving the response message, an endpoint 103-1 authenticates its signature using the public-key of Zone Keeper 102-1. The architecture of this embodiment of the invention does not specify how the public-key of Zone Keeper 102-1 is distributed to endpoints 103-1. Additionally, the existence of a public-key infrastructure (PKI) is not required in practicing this embodiment of the invention. It is noted that although the above discussion of intra-zone security used Security Zone 102-1, Zone Keeper 102-1 and endpoints 103-1, as an example, the processes and techniques discussed are equally applicable to any additional Security Zones including a Zone Keeper and endpoints. Another example being Security Zone 101-2, Zone Keeper 102-2 and endpoints 103-2.

Figure 3:
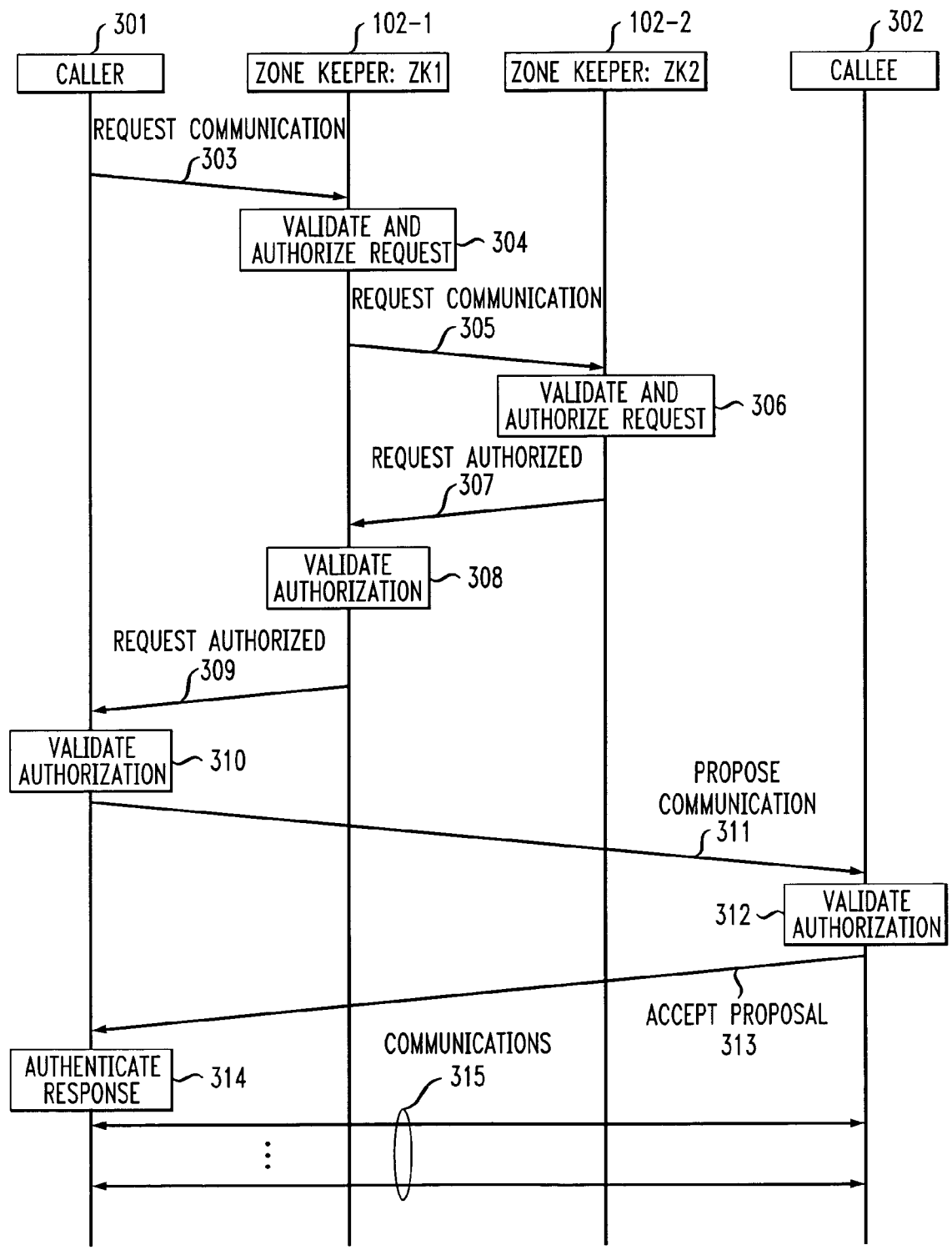
FIG. 3 is an information flow diagram illustrating the Set-up process for a secure inter-zone communication between a caller and a callee employing the invention.

FIG. 3 is an information flow diagram illustrating the Set-up process for a secure inter-zone communication between caller 301 and callee 302 employing the invention. Shown, is caller 301 employing, for example, endpoint 103-1-2 in Security Zone 101-1, Zone Keeper 102-1 for Security Zone 101-1, Zone Keeper 102-2 for Security Zone 101-2 and callee 302 employing, for example, endpoint 103-2-3 in Security Zone 101-2. Then, the steps taken in setting up a secure multimedia communication between caller 201 employing endpoint 103-1-1 in Security Zone 101-1, and callee 202 employing endpoint 103-1-2 in Security Zone 101-2 are as follows:

Step 303 Caller 301, employing endpoint 103-1-2, sends a communication request to Security Zone 101-1 Zone Keeper 102-1.

Step 304 Zone Keeper 102-1 authenticates the identity of caller 301.

Step 305 On behalf of caller 301, Zone Keeper 102-1 for Security Zone 101-1 requests authorization, in this example, from Zone Keeper 102-2 for Security Zone 101-2. Realizing that callee 302 is in another Security Zone, Zone Keeper 102-1 forwards the request from caller 301 to Zone Keeper 102-2 for callee 302. However, Zone Keeper 102-1 "signs" the request message with its own private-key so that Zone Keeper 102-2 can authenticate that the request is from Zone Keeper 102-1.

Step 306 Zone Keeper 102-2 authenticates the signature of Zone Keeper 102-1 and authorizes the request. Since the request still contains the requirements of caller 301, Zone Keeper 102-1 can determine whether caller 301 and callee 302 are security compatible for the requested communication.

Step 307 Zone Keeper 102-2 sends authorization to Zone Keeper 102-1. The authorization includes the digital signature of Zone Keeper 102-2 so that Zone Keeper 102-1 can authenticate that the authorization is indeed from Zone Keeper 102-2. Also included in the authorization is the security information for caller 301 to authenticate callee 302.

Step 308 Zone Keeper 102-1 authenticates the authorization sent by Zone Keeper 102-2.

Step 309 Zone Keeper 102-1 relays the authorization back to caller 301. Zone keeper 102-1 also attaches its own digital signature to the authorization.

Step 310 Caller 301 authenticates the authorization by verifying the digital signature of Zone Keeper 102-1.

Step 311 Caller 301 requests connection to callee 302. The request includes the authorization from Zone Keeper 102-2 and a communication proposal.

Step 312 Callee 302 authenticates the authorization and communication proposal. Callee 302 can verify the digital signature of Zone Keeper 102-2 by using its public-key.

Step 313 Callee 302 sends back to caller 301 the agreement for their communication.

Step 314 Caller 301 authenticates the identity of callee 302.

Step 315 Based on their agreements, caller 301 and callee 302 start their communication.

Note that the steps taken to establish an inter-zone communication are symmetrical to the steps taken to establish an intra-zone communication. In this particular embodiment, users/endpoints do not have to know the security mechanism for establishing an inter-zone secure communication. Additionally, users/endpoints in different security zones can communicate securely as though they are in the same zone.

The inter-zone embodiment requires the Zone Keepers to authenticate each other using public-key cryptography. This requirement allows this embodiment to scale up from intra-zone security.

Additionally, the Zone Keepers each provide the capability to expand its trust to other zones. Specifically, each of the Zone Keepers is able to:

1. control a list of trusted zones (A profile may be created for each zone that contains the address of its Zone Keeper and public-key, and security requirements or classifications.);
2. relay the authorization back to the caller and callee endpoints.

Implementation of an Embodiment of the Invention in H.323

H.323 is an ITU-T standard defined for multimedia communication. The protocols and their security required in this embodiment are summarized as follows:

RAS—RAS (Registration, Admission and Status) provides the vehicle for the Gatekeeper (Zone Keeper) to manage endpoints and their requests within a H.323 zone. Endpoint authentication, integrity of RAS packets, and access control are the primary security issues. RAS uses UDP (User Datagram Protocol) as the transport mechanism.

Q.931—This protocol uses TCP (Transport Control Protocol) as its transport mechanism. Its role is to originate the first of many possible point-to-point communications between two endpoints. This Q.931 protocol needs to be secured because it is used to exchange authorization and subsequent security information between endpoints. The security issues for Q.931 are message authentication, encryption, and integrity.

H.245—This protocol uses TCP as its transport mechanism. It carries control messages governing endpoint operations, including capabilities exchange and media stream privacy. The security of a H.235 connection is first negotiated by Q.931 messages. It has the same security requirements as Q.931.

RTP/RTCP (Real time Protocol/Real Time Control Protocol)—This is a Media Stream protocol suite that governs the transportation of video and audio packets. The primary security issue for the Media Stream is encryption.

The security of RAS messaging is most critical for the architecture. Both authentication and authorization information obtained by RAS message exchanges provide the basis for implementing Q.931, H.245, and Media Stream security.

It is felt best to discuss certain H.323 terminology prior to pursuing further disclosure of this embodiment of the invention on H.323.

Gatekeeper (hereinafter Zone Keeper) a H.323 entity on the network that provides address translation and controls access to the network for H.323 endpoints. Note Zone Keeper (Gatekeeper) is an optional component in H.323 but is required in the embodiment of the invention.

H.323 Endpoint—a H.323 terminal, Gateway, or MCU. An endpoint can call and be called. It generates and/or terminates information streams.

H.323 entity—any H.323 component, including terminal, Gateway, Gatekeeper, MC (Multipoint Controller), MP (Multipoint Processor), and MCU (Multipoint Control Unit).

Figure 4:
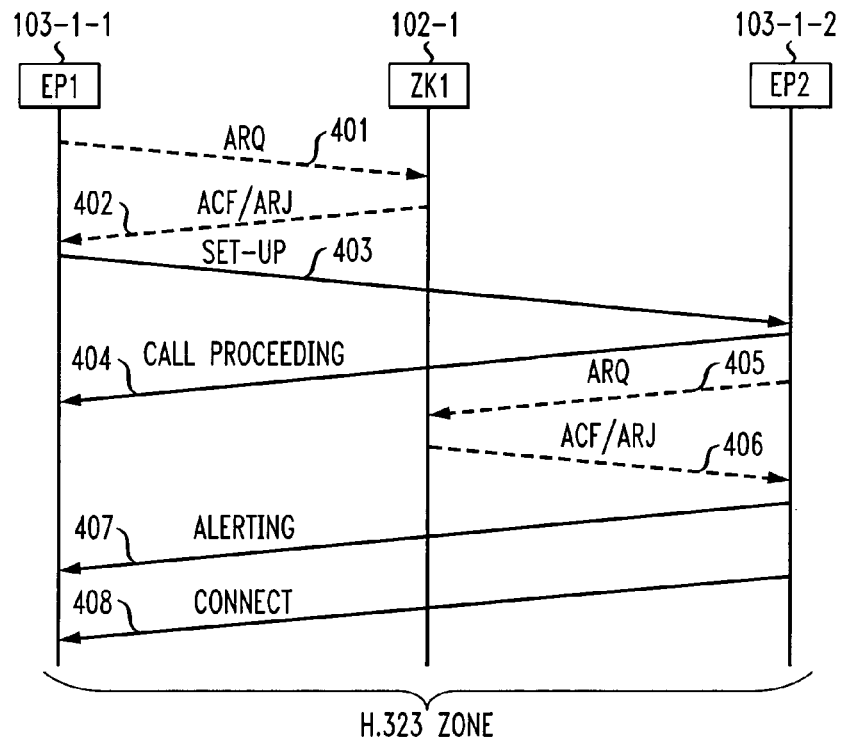
FIG. 4 is an information flow diagram illustrating the Set-up process for a H.323 security system secure intra-zone communication between a calling endpoint and a called endpoint employing the invention.

FIG. 4 is an information flow diagram illustrating the call setup process between a calling endpoint and a called endpoint in H.323.

Step 401 Endpoint (EP1) 103-1-1 in Zone 101-1 sends an ARQ (Admission Request) message to Zone Keeper (ZK1) 102-1.

Step 402 ZK1 sends an ACF (Admission Confirmed) message if the request is accepted or an ARJ (Admission Rejected) message back to EP1. The ACF message includes the Q.931 port number of endpoint (EP2) 103-1-2.

Step 403 EP 1 then sends a Set-up message to EP2 including the port number of EP2.

Step 404 EP2 sends a Call Proceeding message to EP1.

Step 405 EP2 sends an ARQ message to ZK1.

Step 406 ZK1 sends either an ACF message or an ARJ message to EP2.

Step 407 If EP2 receives an ARJ message from ZK1, EP2 sends an Alerting message to EP1.

Step 408 If EP2 receives an ACF message from ZK1, EP2 sends a Connect message to EP1. The Connect message includes a H.245 control channel port number for use in H.245 signaling.

ARQ, ACF, and ARJ are messages defined in H.323 for communication between endpoints and Zone Keeper. Set-up, Call Proceeding, Alerting, and Connect are messages defined in H.323 for endpoint communications.

Figure 5:
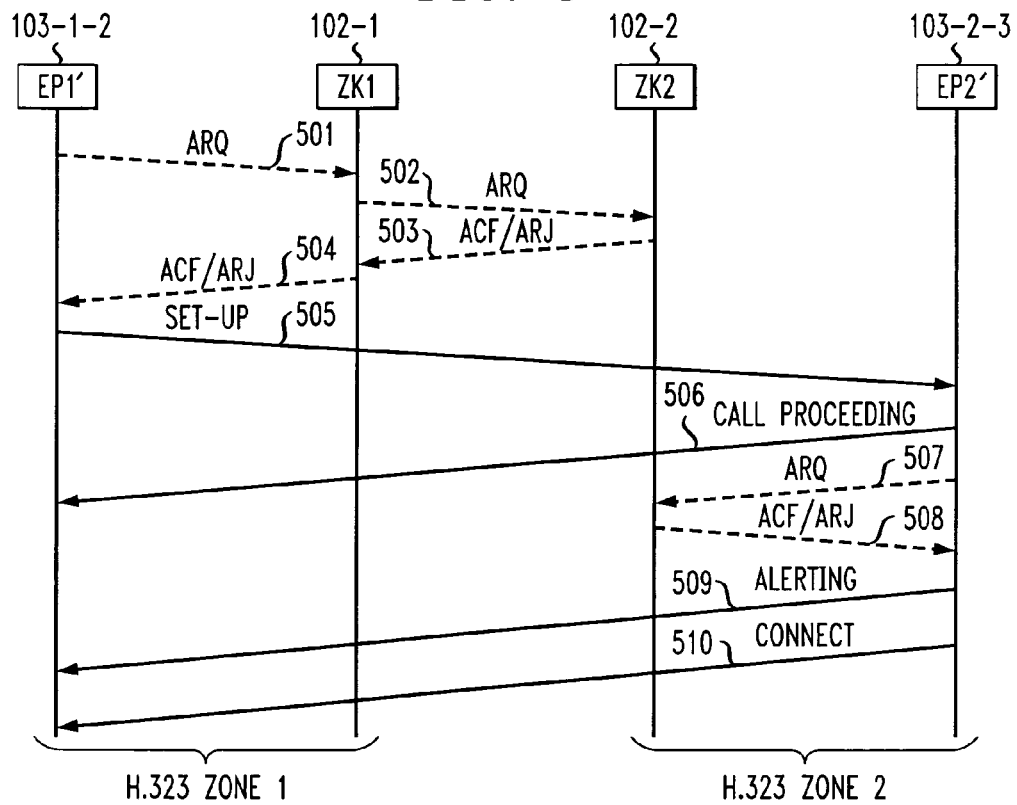
FIG. 5 is an information flow diagram illustrating the Set-up process for a H.323 security system secure inter-zone communication between a calling endpoint and a called endpoint employing the invention.

FIG. 5 is a possible information flow diagram illustrating the call setup process for establishing communication between a calling endpoint and a called endpoint in different H.323 zones.

Step 501 Endpoint (EP1') 103-1-2 in Security Zone 101-1 sends an ARQ (Admission Request) message to Zone Keeper (ZK 1) 102-1.

Step 502 ZK1 on behalf of EP1' sends an ARQ message to Zone Keeper (ZK2) 102-2, which registers the called endpoint (EP2') 103-2-3.

Step 503 ZK2 sends an AFC message including the Q.931 port number of EP2' to ZK1.

Step 504 ZK1 relays the ACF message from ZK1 to EP1'.

Step 505 EP1', in response to the supplied ACF message, sends a Set-up message to the Q.931 port of EP2'.

Step 506 EP2' sends a Call Proceeding message to EP1'.

Step 507 If EP2' accepts the call, it sends an ARQ message to ZK2.

Step 508 ZK2 sends an ACF message to EP2'.

Step 509 If EP2' receives an ARJ message from ZK2, EP2' sends a Release Complete message to EP1'.

Step 510 If EP2' receives an ACF message from ZK2, EP2' sends a Connect message to EP1'. The Connect message includes a H.245 control channel port number for use in H.245 signaling.

For further details of H.323 see for example, ITU-T Recommendation H.323 (1998), "Packet Based Multimedia Communications Systems".

This embodiment of the invention uses the so-called Direct-routed Call model for setting up communications. One important characteristic of this model is that it requires minimum message exchanges between H.323 entities. Two advantages are realized by employing this Direct-routed model. One advantage is minimizing message exchanges that directly reduce cost. This is because security comes at the cost of performance degradation and added complexity. Another advantage is that the Zone Keeper is only involved in RAS message exchanges. This improves the scalability of the architecture since the Zone Keeper communication is eliminated as a possible performance bottleneck.

Under the Direct-routed Call model, steps 405 and 406 in FIG. 4, and steps 507 and 508 in FIG. 5 can be avoided.

Figure 6:
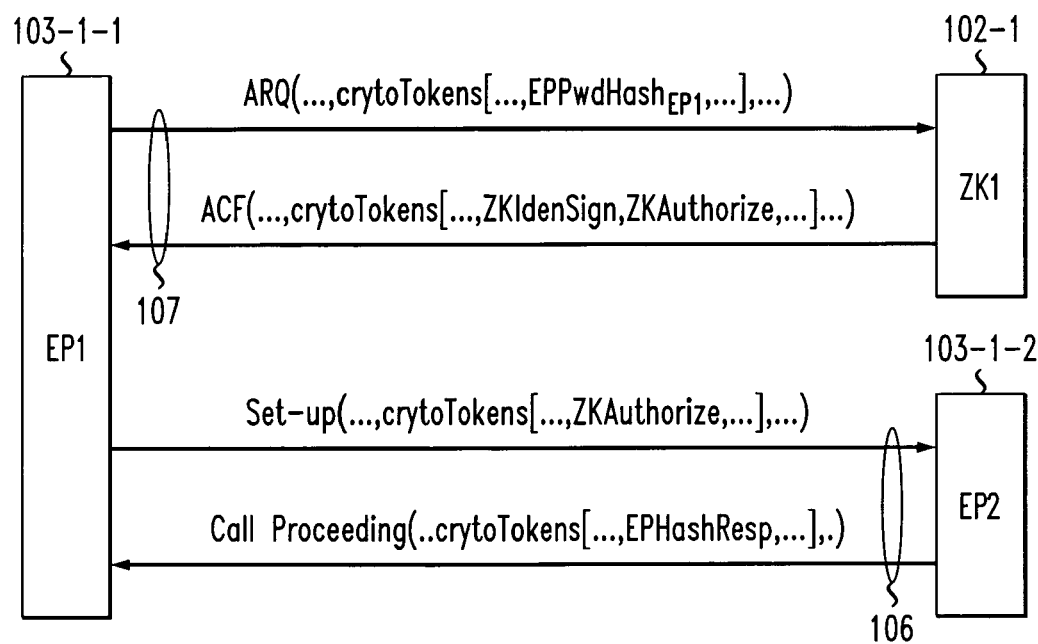
FIG. 6 is a diagram illustrating the use of security tokens for intra-zone communication between a caller and a callee employing the invention.

FIG. 6 is a diagram illustrating how an embodiment of the invention is implemented under the H.323 framework for securing intra-zone communication. This implementation of this embodiment of the invention assumes the following:

Zone Keeper is implemented by a H.323 Gatekeeper.

All users/endpoints are authenticated by ID/Password and a challenge-response protocol. The latter ensures that the password is not sent directly for the authentication purpose. Instead, an endpoint must prove a user's identity by generating a response using his/her password according to a randomly created challenge.

Additionally, the following security tokens, i.e., self-contained security information, are defined here and employed in establishing intra-zone communication between a caller and callee. Under H.235, the security standard for H.323, the so-called crytoHashedToken is employed, where a message checksum is included in the security token to ensure its integrity. Particularly, a receiver can detect whether any original information has been tampered with by re-computing its checksum.

EPPwdHash—Sent by caller to its Zone Keeper. It contains the information required for authenticating messages sent by a registered caller. To avoid replay attack, where a security intruder copies this information and pretends to be the caller, the following information may be included:
 time stamp: information concerning when the token is created.
 a random value to ensure the uniqueness of the hash.

ZKldenSign—Sent by the Zone Keeper to the caller. It contains a signature by the Zone Keeper so that the caller can authenticate the message is indeed from its Zone Keeper. Again, to avoid replay attack, both time stamp and a random value should be included in the creation of the signature. Also included in the token is the response that the caller will use to authenticate the callee.

ZKAuthorize—Created by the Zone Keeper and sent to the calling endpoint, which then forwards the token to the callee. This token shall contain information that conveys the authorization and authentication given to the caller by the Zone Keeper. An example of this information includes:
 Caller's network address
 Callee's network address
 Conference ID
 Conference goal
 Valid time interval. The token has to be presented within this time frame to be considered valid.

Additionally, this token includes a challenge value for the callee.

EPHashResp—Created by the callee and returned to the caller. It contains information required for authenticating the callee to the caller. At the minimum, both time stamp and a random value should be included in the creation of the token to avoid replay attack.

Referring to FIG. 6, shown are the steps in setting up an intra-zone communication between two endpoints in a Security Zone. In this example, endpoint (EP1) 103-1-1 and (EP2) 103-1-2 and including Zone Keeper (ZK1) 102-1 in Security Zone 101-1 of FIG. 1. Specifically, the steps taken in setting up the intra-zone communication are as follows:

1. Endpoint (EP1) 103-1-1 sends an ARQ message, an Admission Request message defined in H.323 for Gatekeeper (Zone Keeper) including an EPPwdHash token, to Zone Keeper (ZK1) 102-1.

2. ZK1 authenticates the EPPwdHash token using a password registered by the user employing EP1.

3. If ZK1 determines that the communication should be allowed, it creates both ZKIdenSign and ZKAuthorize tokens using its private-key. Then, the ZKIdenSign and ZKAuthorize tokens are inserted into an ACF message, a Request Confirmation message, which is sent to EP1. ACF is a H.323 Zone Keeper (Gatekeeper) message.

4. EP1 authenticates the ZKIdenSign token in the ACF message with the public-key of ZK1.

5. EP1 extracts the ZKAuthorize token from the ACF message. Then, EP1 sends a Set-up message including the ZKAuthorize token to endpoint (EP2) 103-1-2. The Set-up message is a H.323 message defined for endpoint communication.

6. EP2 authenticates the ZKAuthorize token in the Set-up message using the public-key of ZK1.

7. EP2 extracts the challenge value included in the ZKAuthorize token and generates a response using its user's password. An EPHashResp token including the response is created.

8. EP2 sends a H.323 Call Proceeding message including the EPHashResp token to EP1.

9. EP1 authenticates the EPHashResp token to authenticate EP2.

Note that in this intra-zone communication scenario, that ZK1 is able to authorize an intra-zone communication. Additionally, both EP1 and EP2 are able to authenticate each other.

Figure 7:
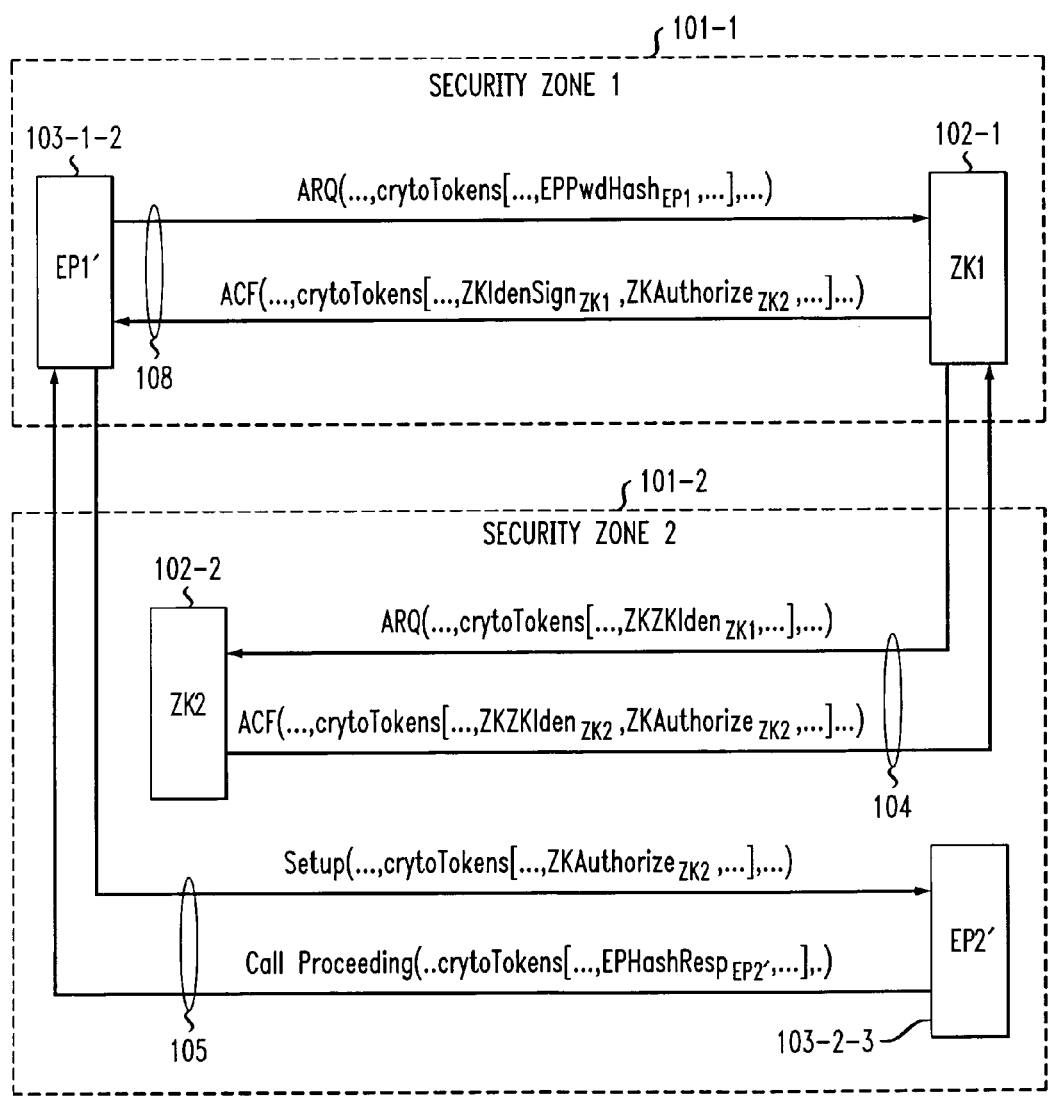
FIG. 7 is a diagram illustrating the use of security tokens for inter-zone communication between a caller and a callee employing the invention.

FIG. 7 is a diagram illustrating an embodiment of the invention that is implemented under the H.323 framework for securing inter-zone communication. This implementation of an embodiment of the invention also employs the process described above for setting up an intra-zone communication (FIG. 6). Additionally, a new security token is added for inter-zone communication security, namely, ZKZKIden—Sent by one Zone Keeper to another. It includes the information needed by the callee to authenticate the caller. An example of this information includes
 Valid time interval
 A random value
 Zone Keeper ID Referring to FIG. 7, shown are the steps in setting up an inter-zone communication between two endpoints in two different Security Zones. In this example, endpoint (EP1') 103-1-2 in Security Zone (SZ1) 101-1 and including Zone Keeper (ZK1) 102-1, and endpoint (EP2') 103-2-3 in Security Zone (SZ2) 101-2 including Zone Keeper (ZK2) 102-2 of FIG. 1. Specifically, the steps taken in setting up the inter-zone communication are as follows:

1. EP1' sends an ARQ message including the EPPwdHash token of EP1' to ZK1. ZK1 authenticates the EPPwdHash token using EP1's user password. If ZK1 allows the communication, it sends an ARQ message, on behalf of EP1' to ZK2 in SZ2.

ZK1 creates a ZKZKIden token using its private-key and includes it in the ARQ message.

Determining that the ARQ message is from a different zone than SZ2, ZK2 uses the public-key for ZK1 to authenticate the ZKZKIden token.

2. If ZK2 allows the communication, it creates a ZKAuthorize token using its private-key. This ZKAuthorize token represents ZK2's authorization. Additionally, ZK2 creates a ZKZKIden token for authenticating itself to ZK1. The ZKAuthorize and ZKZKIden tokens are included in an ACF message and, thereby, returned to ZK1.

3. After ZK1 authenticates the ZKZKIden token using ZK2's public-key, ZK1 sends the ACF to EP1'.

ZK1 creates its own ZKIdenSign token and includes it in the ACF message. The response field in the ZKZKIden token is copied to the ZKIdenSign token.

ZK1 replaces the ZKZKIden token by its ZKIdenSign token in the ACF. EP1' does not make any modification to the ZKAuthorize token in the ACF message.

4. After authenticating the ZKIdenSign token in the ACF message, EP1' sends a Set-up message including a ZKAuthorize token including a prescribed challenge value to EP2'.

EP2' authenticates the ZKAuthorize token using ZK2's public-key.

EP2' extracts a challenge value included in the ZKAuthorize token and generates a response using its user's password. An EPHashResp including the response is created.

5. EP2' sends a Call Proceeding message including the EPHashResp token to EP1'.

EP1' authenticates responses in both the ZKIdenSign token and the EPHashResp token to authenticate EP2'.

The inter-zone scenario outlined by the above steps shows that both Zone Keepers, ZK1 and ZK2, are able to perform communication access control for inter-zone a communication. Additionally, endpoints, for example, EP1' and EP2', in different zones are able to authenticate each other. It is particularly important that endpoints can authenticate requests from other zones as though they were all in the same zone.

The above described embodiments are, of course, merely illustrative of the principles of the invention. Indeed, numerous other methods or apparatus may be devised by those skilled in the art without departing from the spirit and scope of the invention.

What is claimed is:

1. A method for establishing a secure communication between users employing endpoints in a system including one or more security zones, each security zone including one or more of said endpoints and a Zone Keeper, wherein at least one of said users is a caller utilizing a first endpoint in one of said one or more security zones and at least another one of said users is a callee utilizing a second endpoint in one of said one or more security zones, the method including the steps of:

said caller sending a communication request message including a communication request for establishing a secure multimedia communication including security information identifying said caller, via said first endpoint to a first one of said Zone Keepers associated with a security zone including said first endpoint;

said first Zone Keeper authenticating the identity of said caller, and if said caller identity is authenticated, authorizing said caller's communication request;

said first Zone keeper determining whether said requested secure communication is an intra-zone or an inter-zone communication:

if said requested communication is an intra-zone communication both said first and second endpoints are in the same security zone, said first Zone Keeper in conjunction with said first and second endpoints in said first security zone establishing said secure communication between said caller and said callee;

if said requested communication is an inter-zone communication said first and second endpoints are in first and second security zones, respectively, said first Zone Keeper sending said request message to said second Zone Keeper associated with said second security zone; and establishing said secure inter-zone communication utilizing said first Zone Keeper, said first endpoint in said first security zone, said second Zone Keeper and said second endpoint in said second security zone.

2. The method as defined in claim 1 further including providing a capability by each of said Zone Keepers for users of an endpoint in a security zone associated with a particular Zone Keeper to register authentication keys and/or methods and said particular Zone Keeper authenticating said users only through said registered keys and/or methods to honor requests for secure communication.

3. The method as defined in claim 1 further including providing a capability by each of said Zone Keepers to have registered authentication keys and/or methods of endpoints in a security zone associated with a particular Zone Keeper and said particular Zone Keeper authenticating only users authenticated by said user authentication keys and/or methods and said endpoint authentication keys and/or methods to honor requests for secure communication.

4. The invention as defined in claim 1 further including providing a capability by each of said Zone Keepers to have registered by users using an endpoint associated with a particular Zone Keeper individual prescribed security policies and said particular Zone Keeper enforcing said prescribed security policies.

5. The method as defined in claim 1 wherein said intra-zone communication is established by the further steps of said first Zone Keeper sending an authorization message including an authorization of said caller communication request to said caller, via said first endpoint, said authorization including security information identifying said first Zone Keeper and security information identifying said callee;

said caller authenticating the authorization sent by said first Zone Keeper;

said caller sending, via said first endpoint, a connection request message including a communication proposal for establishing a multimedia communication connection with said callee, via said second endpoint;

said callee authenticating said authorization and said communication proposal;

said callee sending, via said second endpoint, to said caller via said first endpoint, an acceptance message indicating that said callee accepts the communication proposal, said message including security information identifying said callee;

said caller authenticating the identity of said callee; and if said caller authenticates said identity of said callee, establishing said caller and said callee communication through said first and second endpoints in said first security zone, wherein a secure multimedia communication is established.

6. The method as defined in claim 5 further including, if said first Zone Keeper rejects said communication request from said caller, said first Zone Keeper sending an authorization rejected message indicating that said communication request was rejected to said caller, via said first endpoint.

7. The method as defined in claim 5 wherein said connection request message includes said communication authorization and security information for authenticating the identity of said callee.

8. The method as defined in claim 7 wherein said connection message further includes a proposal indicating how the caller-callee communication should be set-up.

9. The method as defined in claim 5 further including said first Zone Keeper employing a prescribed security arrangement for authenticating the identity of said caller.

10. The method as defined in claim 9 wherein said prescribed security arrangement includes using a caller identification (ID) and corresponding password.

11. The method as defined in claim 5 wherein said connection request message includes said authorization from said Zone Keeper, security information identifying said caller to said callee and a communication proposal of how the secure caller—callee communication connection is to be set-up.

12. The method as defined in claim 11 wherein said connection request message further includes security information for authenticating the identity of said callee.

13. The invention as defined in claim 11 further including said first Zone Keeper providing authentication of its identity by using public-key cryptography and a digital signature and wherein said users authenticate the first Zone Keeper identity by employing said first Zone Keeper's public key.

14. The invention as defined in claim 13 further obtaining said digital signature by said first Zone Keeper signing said request response message with a private-key.

15. The method as defined in claim 1 wherein inter-zone communication is established by the further steps of
said first Zone Keeper forwarding said communication request message to a second Zone Keeper associated with said second security zone;
said second Zone Keeper authenticating that the communication request message is from said first Zone Keeper;
said second Zone Keeper sending an authorization message including an authorization of said caller communication request to said first Zone Keeper, said authorization message including security information identifying said second Zone Keeper and security information identifying said callee;
said first Zone Keeper authenticating the authorization in said authorization message sent by said second Zone Keeper;
if said authorization in said authorization message is authenticated, said first Zone keeper sending said authorization message to said caller via said first endpoint;
said caller sending, via said first endpoint, a connection request message including a communication proposal for establishing a secure multimedia communication connection with said callee, via said second endpoint;
said callee authenticating said authorization and said communication proposal;
said callee sending, via said second endpoint, to said caller via said first endpoint, an acceptance message indicating that callee accepts the communication proposal, said message including security information identifying said callee;
said caller authenticating the identity of said callee; and
if said caller authenticates said identity of said callee, establishing said caller and said callee communication through said first and second endpoints, wherein a secure multimedia communication is established.

16. The method as defined in claim 15 further including, if said first Zone Keeper rejects said communication request from said caller, said first Zone Keeper sending an authorization rejected message indicating that said communication request was rejected to said caller, via said first endpoint.

17. The method as defined in claim 15 further including said first Zone Keeper determining whether said caller and said callee are security compatible for the requested secure multimedia communication.

18. The method as defined in claim 17 wherein each of said Zone Keepers has its own private key, and further including said first Zone Keeper signing said communication request message and said second Zone Keeper authenticating that said communication request message was sent by said first Zone Keeper through said first Zone Keeper's private key.

19. The method as defined in claim 18 wherein each of said Zone Keepers has its own digital signature, and further including security information indicating the identity of said callee and said second Zone Keeper including its digital signature in said authorization message sent to said first Zone Keeper, and said first Zone Keeper authenticating the authorization sent by said second Zone Keeper through the digital signature of said second Zone Keeper.

20. The method as defined in claim 19 wherein each of said Zone keepers has its own public key, said caller authenticates said authorization by verifying said digital signature of said first Zone Keeper and said callee authenticates said authorization and communication proposal by verifying the digital signature of said second Zone Keeper through its public key.

21. The method as defined in claim 1 wherein each of said users has its own password which is registered by the user of an endpoint with the endpoint's associated Zone Keeper, and each of said Zone Keepers has its own private key and its own public key and further including said communication request message including a first prescribed security token, said first Zone Keeper authenticating said first prescribed security token, and if said first prescribed security token is authenticated, determining that said communication should be allowed.

22. The method as defined in claim 21 wherein said intra-zone communication is established by the further steps of
said first Zone Keeper generating a second prescribed security token and a third prescribed security token, inserting said second and third prescribed security tokens in an authentication message and sending said authorization message to said first endpoint, said third prescribed security token including a prescribed challenge value;
said first endpoint authenticating said second prescribed security token in said authorization message and extracting said third prescribed security token;
said first endpoint sending a communication set-up message including said third prescribed security token to said second endpoint;
said second endpoint authenticating said third prescribed security token in said set-up message;
said second endpoint extracting said challenge value from said third prescribed security token and generating a response;
generating a fourth prescribed security token including said response;

said second endpoint sending a call proceeding message including said fourth prescribed security token to said first endpoint;

said first endpoint authenticating said fourth prescribed security token to authenticate said second endpoint; and if said second endpoint is authenticated, establishing said secure multimedia communication using said first and second endpoints.

23. The method as defined in claim 22 wherein said first prescribed security token is authenticated by employing the password registered by said user of said first endpoint.

24. The method as defined in claim 23 wherein said second and third prescribed security tokens are generated using said Zone Keeper's private-key.

25. The method as defined in claim 24 wherein said second prescribed security token is authenticated by said first endpoint using said Zone Keeper's public-key.

26. The method as defined in claim 25 wherein said third prescribed security token is authenticated by said second endpoint using said Zone Keeper's public-key.

27. The method as defined in claim 26 wherein said response is generated using said registered password of said user of said second endpoint.

28. The method as defined in claim 27 wherein said first prescribed security token is an EPPwdHash security token, said second prescribed security token is a ZKIdenSign security token, said third prescribed security token is a ZKAuthorize security token and said fourth prescribed security token is an EPHashResp security token.

29. The method as defined in claim 21 wherein said inter-zone communication is established by the further steps of said first Zone Keeper generating a second prescribed security token and including it in a second communication request message;

said first Zone Keeper sending said second communication request message to said second Zone keeper;

said second Zone Keeper determining that said second communication request message from a different security zone than the security zone including said second Zone Keeper, authenticates said second prescribed security token;

if said second Zone Keeper authorizes said communication request in said second communication request message, said second Zone Keeper generating a third prescribed security token and a fourth prescribed security token;

said second Zone Keeper generating a second communication authorization message including said third and fourth prescribed security tokens and sending said second communication authorization message to said first Zone Keeper;

said first Zone Keeper authenticating said fourth prescribed security token and if authenticated generating a fifth prescribed security token and replaces it for said fourth prescribed security token in said second communication authorization message to generate a modified second authorization communication message, and sending said modified second authorization communication message to said first endpoint;

said first endpoint authenticating said fifth prescribed security token in said modified second communication request message;

if said fifth prescribed security token is authenticated, said first endpoint generating a communication set-up message including a sixth prescribed security token including a prescribed challenge value and sending said communication set-up message to said second endpoint;

said second endpoint authenticating said sixth prescribed security token, extracting said prescribed challenge value and generating a response;

generating a seventh prescribed security token including said response;

said second endpoint generating and sending a call proceeding message including said seventh prescribed security token to said first endpoint;

said first endpoint authenticating said responses in said fifth and seventh prescribed security tokens to authenticate said second endpoint; and if said second endpoint is authenticated, establishing said secure multimedia communication using said first and second endpoints.

30. The method as defined in claim 29 wherein said first prescribed security token is authenticated by employing the password registered by said user of said first endpoint.

31. The method as defined in claim 30 wherein said second prescribed security token is generated using said first Zone Keeper's private-key.

32. The method as defined in claim 31 wherein said second prescribed security token is authenticated by said second Zone Keeper using said first Zone Keeper's public-key.

33. The method as defined in claim 32 wherein said third prescribed security token is generated by said second Zone Keeper using said second Zone Keeper's private-key.

34. The method as defined in claim 33 wherein said fourth prescribed security token is generated by said second Zone Keeper using said second Zone Keeper's private-key.

35. The method as defined in claim 34 wherein said first Zone Keeper authenticates said fourth prescribed security token using said second Zone Keeper's public-key.

36. The method as defined in claim 35 wherein said first Zone Keeper generates said fifth prescribed security token using said first Zone Keeper's private-key.

37. The method as defined as defined in claim 36 wherein said fifth prescribed security token is authenticated by said first endpoint using said first Zone Keeper's public-key.

38. The method as defined in claim 37 wherein said sixth prescribed security token is authenticated by said second endpoint using said second Zone Keeper's public-key.

39. The method as defined in claim 38 wherein said response is generated using said registered password of said user of said second endpoint.

40. The method as defined in claim 39 wherein said first prescribed security token is an EPPwdHash security token, said second prescribed security token is a ZKZKIden security token, said third prescribed security token is a ZKAuthorize security token, said fourth prescribed security token is a second ZKZKIden security token, said fifth prescribed security token is a ZKIdenSign security token, said sixth prescribed security token is a second ZKAuthorize security token and said seventh prescribed security token is an EPHashResp security token.

41. A method for establishing a secure communication between users employing endpoints in a system including one or more security zones, each security zone including one or more of said endpoints and a Zone Keeper, wherein at least one of said users is a caller utilizing a first endpoint in one of said one or more security zones and at least another one of said users is a callee utilizing a second endpoint in one of said one or more security zones, the method including the steps of:

said caller sending a communication request message including a communication request for establishing a secure multimedia communication including security information identifying said caller, via said first endpoint to a first one of said Zone Keepers associated with a security zone including said first endpoint;

said first Zone Keeper authenticating the identity of said caller, and if said caller identity is authenticated, authorizing said caller's communication request;

said first Zone keeper determining whether said endpoint being used by said callee is in said first security zone or in a second one of said security zones;

if it is determined that said second endpoint in said second security, said first Zone Keeper forwarding said communication request message to a second Zone Keeper associated with said second security zone;

said second Zone Keeper authenticating that the communication request message is from said first Zone Keeper;

said second Zone Keeper sending an authorization message including an authorization of said caller communication request to said first Zone Keeper, said authorization message including security information identifying said second Zone Keeper and security information identifying said callee;

said first Zone Keeper authenticating the authorization in said authorization message sent by said second Zone Keeper;

if said authorization in said authorization message is authenticated, said first Zone keeper sending said authorization message to said caller via said first endpoint;

said caller sending, via said associated one of said endpoints, a connection request message including a communication proposal for establishing a secure multimedia communication connection with said callee, via said second endpoint;

said callee authenticating said authorization and said communication proposal;

said callee sending, via said second endpoint, to said caller via said first endpoint, an acceptance message indicating that callee accepts the communication proposal, said message including security information identifying said callee;

said caller authenticating the identity of said callee; and if said caller authenticates said identity of said callee, establishing said caller and said callee communication through said first and second endpoints, wherein a secure multimedia communication is established.

42. The method as defined in claim 41 further including, if said first Zone Keeper rejects said communication request from said caller, said first Zone Keeper sending an authorization rejected message indicating that said communication request was rejected to said caller, via said first endpoint.

43. The method as defined in claim 41 further including said first Zone Keeper determining whether said caller and said callee are security compatible for the requested secure multimedia communication.

44. The method as defined in claim 43 wherein each of said Zone Keepers has its own private key, and further including said first Zone Keeper signing said communication request message and said second Zone Keeper authenticating that said communication request message was sent by said first Zone Keeper through said first Zone Keeper's private key.

45. The method as defined in claim 44 wherein each of said Zone Keepers has its own digital signature, and further including security information indicating the identity of said callee and said second Zone Keeper including its digital signature in said authorization message sent to said first Zone Keeper, and said first Zone Keeper authenticating the authorization sent by said second Zone Keeper through the digital signature of said second Zone Keeper.

46. The method as defined in claim 45 wherein each of said Zone keepers has its own public key, said caller authenticates said authorization by verifying said digital signature of said first Zone Keeper and said callee authenticates said authorization and communication proposal by verifying the digital signature of said second Zone Keeper through its public key.

* * * * *